United States Patent [19]

Nakano et al.

[11] Patent Number: 4,583,132
[45] Date of Patent: Apr. 15, 1986

[54] RECORDING/REPRODUCING APPARATUS FOR SELECTIVELY PROCESSING MONAURAL, STEREO AND BILINGUAL SIGNALS

[75] Inventors: Kenji Nakano; Hisayoshi Moriwaki; Keiichiro Shimada; Takao Takahashi, all of Kanagawa, Japan

[73] Assignee: Sony Corporation, Tokyo, Japan

[21] Appl. No.: 478,490

[22] Filed: Mar. 24, 1983

[30] Foreign Application Priority Data

Mar. 25, 1982 [JP] Japan .................................. 57-48013

[51] Int. Cl.⁴ ........................................... H04N 5/782
[52] U.S. Cl. ................................... 360/19.1; 358/341; 358/343
[58] Field of Search ..................... 358/341, 343, 327; 360/19.1, 9.1, 11.1, 27; 369/48, 49

[56] References Cited

U.S. PATENT DOCUMENTS

| | | | |
|---|---|---|---|
| 4,353,098 | 10/1982 | Heinz et al. | 360/9.1 |
| 4,393,489 | 7/1983 | Mehrotra | 358/343 X |
| 4,394,762 | 7/1983 | Nabeshima | 360/53 |
| 4,399,329 | 8/1983 | Wharton | 358/343 X |
| 4,445,151 | 4/1984 | Kinoshita et al. | 360/27 |
| 4,446,488 | 5/1984 | Suzuki | 358/342 |

Primary Examiner—Robert L. Richardson
Attorney, Agent, or Firm—Lewis H. Eslinger; Alvin Sinderbrand

[57] ABSTRACT

A system for use in recording/reproducing video and audio signals, where the audio signals to be recorded can consist of various kinds of signals such as stereo signals, bilingual signals, or monaural signals, in which the kind of audio signal that is present in the signal to be recorded is detected and a corresponding code is added to the audio signal prior to being encoded and recorded. During playback, the particular code is detected and used to control switches to select the corresponding proper audio reconverting system based on the detected code.

16 Claims, 7 Drawing Figures

RECORDING/REPRODUCING APPARATUS FOR SELECTIVELY PROCESSING MONAURAL, STEREO AND BILINGUAL SIGNALS

BACKGROUND OF THE INVENTION

1. Field of the Invention

The present invention relates to a helical scanning type recording/reproducing apparatus suitably used for a video tape recorder for recording a coded sound signal in an extended end portion of a video track.

2. Description of the Prior Art

In a known helical scanning type VTR, one end portion of the track is extended to record a time-base compressed coded sound signal in a time divisional manner with the video signal. In a one-rotation, two-head VTR of this type, even if a recording density is increased by decreasing the tape speed, the quality of reproduced sounds may not be degraded. Furthermore, a two-channel sound signal (stereo or bilingual signal) can be recorded and reproduced. In addition to this, new sound signals can be after-recorded on a magnetic tape which is already recorded.

A video signal recorded portion on the tracks corresponds to half revolution (180°) of the reproducing or rotary magnetic head. In order to obtain a recording portion (about 30°) of the coded sound signals by extending an end portion of the video track, an angle formed by the magnetic tape partially wound around a head drum is set to be about 210°. Therefore, while one of the magnetic heads scans the recording portion of the coded sound signals, the other simultaneously scans part of the video tracks. In this manner, a so-called overlap scanning is performed.

Two-channel coded sound signal sources include a stereo broadcasting signal, a bilingual broadcasting signal and an input signal from a stereo microphone. The sources also include after recording of the above-mentioned signals, two-channel recording of a monaural signal as left and right channel signals (LR), and recording of the monaural signal, either the single left or right channel.

In general, the reproducing mode is exclusively determined. For example, a reproduced signal is produced upon an assumption that first and second channels are defined as left (L) and right (R) channels, respectively. Another case may also be assumed that (L+R) and (L−R) signals are recorded in the first and second channels, respectively. After performing predetermined operations, the L and R signals are reproduced at the left and right channels, respectively.

In the latter case, a manual switch is arranged to select one of bilingual broadcasts or one of the monaural and stereo modes. In a TV receiver, a pilot signal is detected from a multiplex sound signal, thereby providing automatic switching. However, when the sound signal is recorded as a coded sound signal in the VTR, the pilot signal is lost. As a result, automatic switching cannot be performed.

For example, assume that the recording/reproducing apparatus has a function that the (L+R) and (L−R) signals are recorded using two channels and the predetermined operations are performed to produce the L and R channels respectively to the channels. When the tape on which the L and R signals from a stereo microphone in two channels is played back, unnatural sounds are produced, resulting in inconvenience.

SUMMARY OF THE INVENTION

The present invention has been made in consideration of the conventional drawback described above, and an object of the present invention is to provide a sound signal recording and/or reproducing apparatus for recording and reproducing an information signal, wherein the contents of the coded sound signals recorded in two channels are automatically discriminated to properly perform automatic switching of output modes of right and left channels.

Another object of the present invention is to provide a signal recording and/or reproducing apparatus in which the code signal representing the mode of the input sound signal is recorded with the sound signal, thereby the error correction can be performed as to the code signal.

Further object of the present invention is to provide a signal recording and/or reproducing apparatus in which the automatic mode selection of the reproduced sound signals is in response to the various kinds of after recording.

According to this invention, there is provided an apparatus for recording and reproducing an information signal comprising a video signal and two channels of audio signals from an audio signal source in a plurality of successive tracks on a record medium, each track being divided into at least two sections, comprising: means for generating the two channels of audio signal from the output of said audio signal source; means for converting the audio signals into digital form; means for compressing said digitized audio signal; first recording means for recording said compressed digitized audio signal in said plurality of successive tracks such that one field interval of said video signal is recorded in at least one of said sections of each track and one field interval of said digitized audio signal is recorded in another section of each track; means responsive to the output signal of said audio signal source for generating an identification signal representing the contents of the output of said audio signal source; second recording means for recording said identification signal; means for reproducing video signal, digitized audio signal and the identification signal recorded on the record medium; means for expanding the reproduced digitized audio signal; means for reconverting the expanded digitized audio signal to two channels of audio signal; and means responsive to the reproduced identification signal for generating output audio signals from the outputs of said reconverting means.

DETAILED DESCRIPTION OF THE PREFERRED EMBODIMENTS

Figure 1:
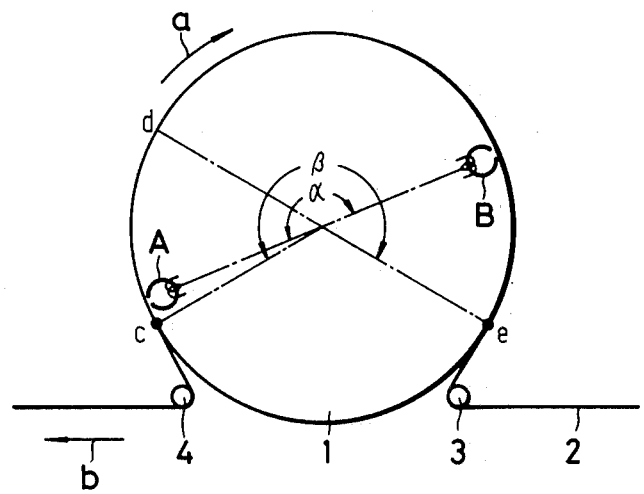
FIG. 1 is a schematic plan view of a head system of a VTR to which the present invention is applied.
Figure 2:
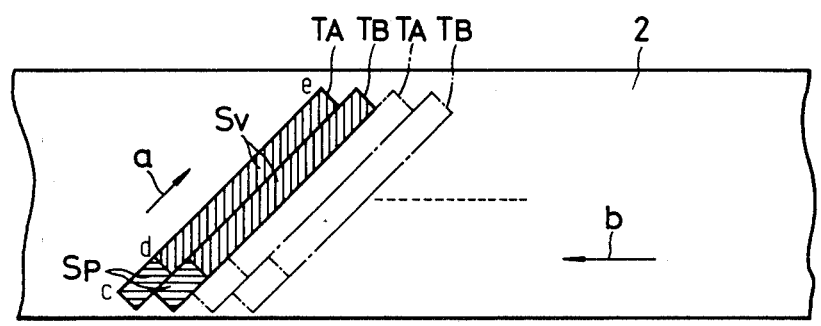
FIG. 2 is a plan view of a portion of a magnetic tape so as to show its recording pattern of the rotary head system of the VTR shown in FIG. 1.

Preferred embodiments of the present invention will be described with reference to the accompanying drawings. FIG. 1 is a schematic plan view of a rotary head drum system of a VTR to which the present invention is applied. FIG. 2 is a plan view of a portion of magnetic tape useful to explain its recording format. Referring to FIG. 1, a rotary drum 1 is rotated in a direction indicated by arrow a. Rotary magnetic heads A and B are disposed on the rotary drum 1 to oppose each other at an angular interval $\alpha$ of about 180°. A magnetic tape 2 is wound around the rotary drum 1 from a point c to a point e so as to form an angle $\beta$ of about 210°. The magnetic tape 2 is then guided by guide pins 3 and 4 and travels in a direction indicated by arrow b. When the magnetic heads A and B are rotated through about 30° ($\beta - \alpha$) corresponding to a distance from the point c to the point d, PCM coded and compressed sound signals are alternately recorded by the magnetic heads A and B. When the magnetic heads A and B are rotated through about 180° corresponding to a distance from the point d to a point e, they alternately record video signals Sv corresponding to one field.

As shown in FIG. 2, a track $T_A$ recorded by the magnetic head A and a track $T_B$ recorded by the magnetic head B are alternately formed on the magnetic tape 2. Points c to e of the track $T_A$ correspond to the points c to e shown in FIG. 1, respectively. An interval corresponding to a distance between the points c and d is a PCM sound signal recording portion $S_p$, whereas an interval corresponding to a distance between points d and e is a one-field video signal recording portion $S_V$. The track $T_B$ has the same pattern as that of the track $T_A$. The magnetic heads A and B scan the magnetic tape 2 in the direction indicated by arrow a, whereas the magnetic tape 2 travels in the direction indicated by arrow b.

Figure 3:
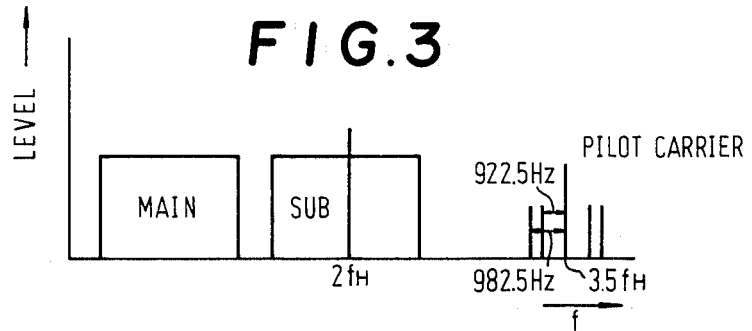
FIG. 3 shows frequency characteristics of a multiplex sound signal.
Figure 4:
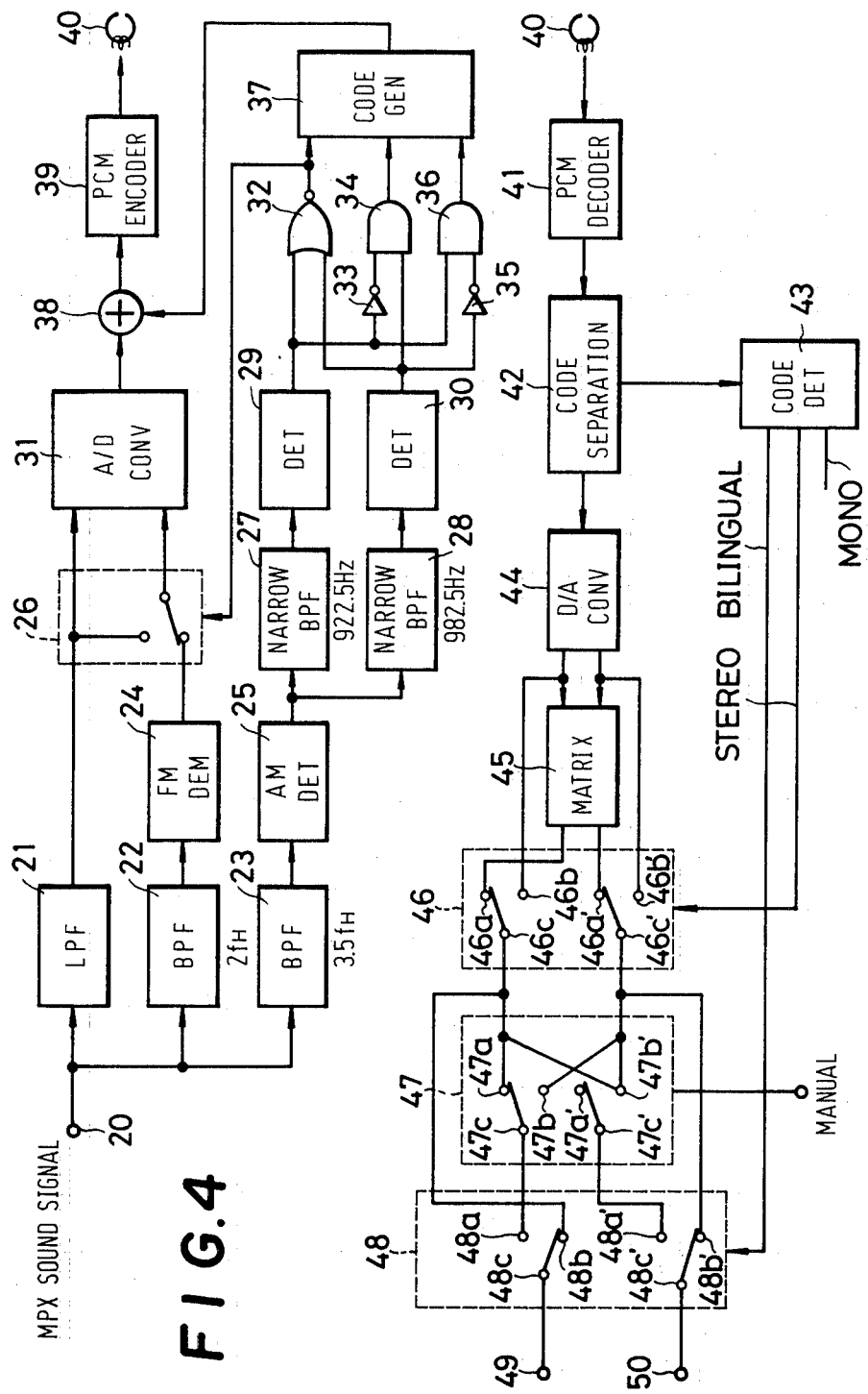
FIG. 4 is a block diagram of a sound signal recording and/or reproducing apparatus according to a first embodiment of the present invention.

The first embodiment in which a multiplex sound signal obtained from a tuner is to be recorded will be explained with reference to FIGS. 3 and 4. FIG. 3 shows frequency characteristics of the multiplex sound signal. A sound signal of a main channel is in a low frequency band, and a carrier signal of 2 fH frequency modulated with a sound signal of a sub channel is in an upper frequency band in relation to that of the main channel. Further a pilot signal representing the characteristics of the multiplex sound signal exists arround 3.5 fH. When the multiplex sound signal is a stereo signal, a pilot carrier of 3.5 fH is amplitude modulated by a single tone signal of 982.5 Hz and when the multiplex sound signal is a bilingual signal, the pilot carrier is amplitude modulated by a single tone signal of 922.5 Hz. And when the multiplex sound signal is a stereo signal, the sound signal of the main channel is L+R and that of the sub channel is L−R. When the multiplex sound signal is a bilingual signal, the sound signal of the main channel is, for example, the Japanese, and that of sub channel is, for example, the English. If the input signal is a monaural signal, it only has a sound signal of the main channel.

Next, the first embodiment of the present invention to which the above explained multiplex sound signal is applied will be explained with reference to FIG. 4. In FIG. 4, the multiplex sound signal supplied to an input terminal 20 is supplied to a low-pass filter 21 and a sound signal of the main channel is separated from the multiplex sound signal. And the signal is supplied to a band-pass filter 22, the center frequency of which is 2 fH and the frequency modulated signal of the subchannel is separated by this filter 22. The pilot signal is separated by a band-pass filter 23, the center frequency of which is 3.5 fH, and the output of this filter is A.M. detected by a detector 25. The output of this detector 25 is the single tone signal of 982.5 Hz if the input signal is a stereo signal and is the single tone signal of 922.5 Hz if the input signal is a bilingual signal. Of course, if the input signal is a monaural signal, no signal can be obtained from this detector. The output signal of the AM detector 25 is supplied to band-pass filters 27 and 28 with a very narrow band. For example, reed filters can be utilized. The center frequency of the band-pass filter 27 is 922.5 Hz and that of the band-pass filter 28 is 982.5 Hz. The outputs of these filters are detected by detectors 29 and 30 respectively. Therefore, if the input signal is a bilingual signal, the output of the detector 29 is high, and if the input signal is a stereo signal, the output of the detector 30 is high. If the input signal is a monaural signal, both outputs of the detectors are low. These outputs of the detectors 29 and 30 are supplied to a logical circuit formed by NOR gate 32, inverters 33 and 35, and AND gates 34 and 36. The output signals of the logic circuit are supplied to a code generator 37 for generating a code signal representing the characteristic of the input signal. For example "00" for monaural, "01" for stereo and "10" for bilingual are assigned.

The output signals of the low-pass filter 21 and the FM demodulator 24 are supplied to an A/D converter 31 through a switch 26 for selecting the outputs of the low-pass filter 21 or the FM demodulator 24 as a second input of the A/D converter 31. In a monaural mode, the output of the low-pass filter 21 is supplied to both first and second input terminals of the A/D converter 31. In a stereo mode, signals of L+R and L−R are recorded in this embodiment. These signals are converted to digital signals by the A/D converter 31. The code signal from the code generator 37 is added to the output of the A/D converter 31 by an adder 38. The output of the adder 38 is supplied to a PCM encoder 39 in which the output of the adder 38 is converted to a PCM signal, the parity signals for error correction are added to the PCM signal and the signal is interleaved for protection from the dropout. The output of the PCM encoder 39 is supplied to a recording head 40.

As is clearly seen from the above explanation, the code signal representing the characteristic of the input sound signal is handled as a part of the data signal, so even if a dropout exists, the error caused by the dropout in the code signal can be corrected by the error correction circuit in the reproducing circuit.

The reproduced signal from a reproducing head 40 is supplied to a PCM decoder 41 in which the reproduced signal is de-interleaved and error correction is performed by a well known method. The decoded signal is supplied to a code separation circuit 42 in which the code signal is separated from the remaining data. And the separated code is supplied to a code detector 43 for generating the respective mode signals. The output of the code separation circuit 42 is supplied to a D/A converter 44 in which two channel signals are generated. The outputs of the D/A converter 44 are supplied to output terminals 49 and 50 through mode selection circuit, and the proper mode signals selected by the code signal are obtained at the output terminals. If the recorded signal is a stereo signal, movable taps 46c and 46c' of a selecting switch 46 are connected to fixed taps 46a and 46a' respectively by a stereo mode signal from the code detector 43, and so output signals L and R of a matrix circuit 45 are selected. The outputs of the switch 46 are led out to the output terminals 49 and 50 through a switch 48. If the recorded signal is a bilingual signal, the outputs of the D/A converter 44 are supplied to a manually selected switch 47 through the switch 46. The switch 47 selects one of signals of main and sub channels, that is, if movable taps 47c and 47c' are connected to fixed taps 47a and 47a' respectively, the signal of the main channel is supplied to both output terminals 49 and 50, and if the movable taps 47c and 47c' are connected to fixed taps 47b and 47b' respectively, the signal of the sub channel is supplied to both output terminals 49 and 50. In this bilingual mode, movable taps 48c and 48c' of the switch 48 are connected to fixed taps 48a and 48a' respectively, and the switch 48 selects the outputs of the manual switch 47. In a monaural mode, the outputs of the D/A converter 44 are led out to the output terminals 49 and 50 through the switches 46 and 48. As is clearly seen from the above explanation, the mode selection can be performed automatically by utilizing the code signal recorded together with the data signal.

Figure 5:
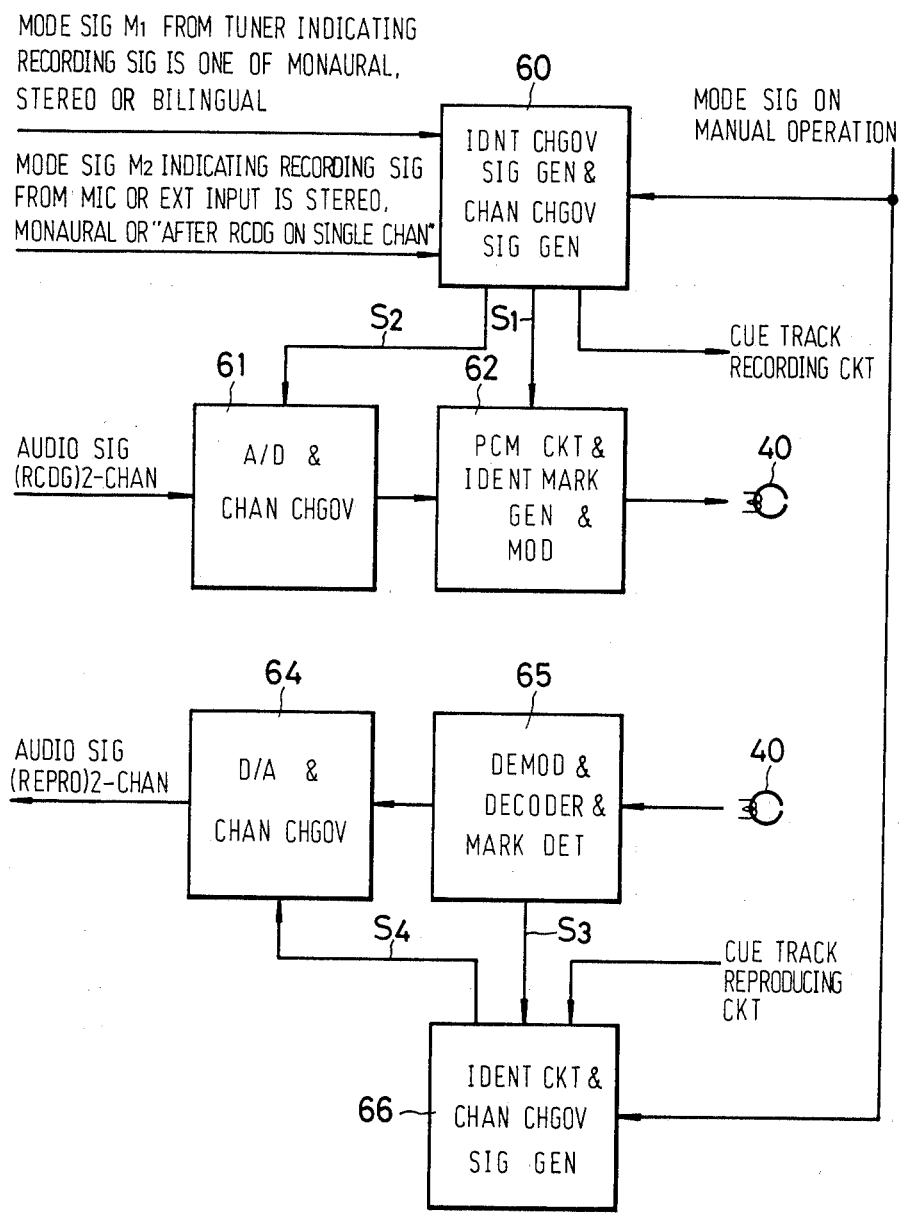
FIG. 5 is a block diagram of a sound signal recording and/or reproducing apparatus according to a second embodiment of the present invention wherein the after-recording and another form of audio signals such as the output of the microphone are considered.

FIG. 5 is a block diagram of a sound signal recording and/or reproducing apparatus according to the second embodiment of the present invention wherein the after-recording and another form of audio signals such as the output of the microphone are considered. In the recording mode, the sound single is supplied to a block 61 which comprises an A/D converter and a channel change-over circuit. The sound signal is processed for first and second channel selection and is A/D converted. The digital sound signal is then supplied to a block 62 which comprises a PCM modulator, a marker generator and an FM modulator. In the block 62, an error correction sign is added to the digital sound signal and a marker ( or a data sync and an address) is added to the beginning of each data block, thereby forming a time-base compressed PCM signal which has a predetermined format. In the block 62, this PCM signal is converted to an NRZ code system and is then FM modulated. The FM-modulated signal is then supplied to a rotary recording head 40.

Figure 6:
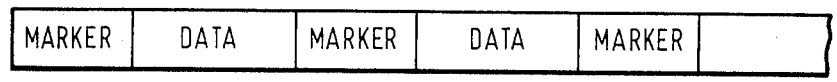
FIG. 6 shows a recording format of a coded sound signal.

FIG. 6 shows a recording format of a PCM sound signal recording portion $S_p$ of each track shown in FIG. 2. In two-channel recording, the data blocks of the first and second channels are respectively sandwiched between the markers and are recorded in every other data area.

Table 1 shows the recording input and the reproduced output which correspond to the type of sound signal to be recorded.

TABLE 1

| Type | | Recording input | | Reproduced output | |
|---|---|---|---|---|---|
| Mode | Content | CH1 | CH2 | R | L |
| A1 | bilingual | Japanese | English | Japanese | English |
| A2 | stereo | R + L | L − R | R | L |
|  | stereo after rec (1) | R + L | L − R | R | L |
| A3 | stereo | R | L | R | L |
|  | stereo after rec (2) | R | L | R | L |

TABLE 1-continued

| Type | | Recording input | | Reproduced output | |
|---|---|---|---|---|---|
| Mode | Content | CH1 | CH2 | R | L |
| A4 | monaural 2-channel mono after rec | monaural monaural | no sound monaural | monaural monaural | monaural monaural |
| A5 | 1-channel mono after rec | original audio source (a) | after rec source (b) | (a) + (b) | (a) + (b) |

The mode A1 in Table 1 indicates that a bilingual signal is received as a recording input. For example, Japanese is recorded on the first channel (CH1), whereas English is recorded on the second channel (CH2). In the mode A2, a stereo signal is received: the R+L signal is recorded on the first channel and the L−R signal (or R−L signal) is recorded on the second channel. After-recording of the stereo signal in the stereo mode (using the first and second channels) can be performed in the same manner as described above. In the mode A3, a stereo microphone output is supplied as a recording input. The R signal is recorded on the first channel, and the L signal is recorded on the second channel. After-recording of the stereo microphone output can be recorded in the same manner as described above.

The mode A4 in Table 1 shows a case in which a monaural broadcasting signal is received as a recording input or a monaural microphone output is received as the recording input. In this case, the monaural sound signal is recorded on the first channel, whereas no signal is recorded on the second channel. After-recording of the monaural signal on one of the channels (as well as 2-channel monaural after-recording) can be performed in the same manner as described above. In this case, the signal recorded on the first channel is erased. In the mode A5, one-channel after-recording is performed. The monaural broadcasting signal or the monaural microphone output is recorded on a free channel. The previous monaural signal is left unerased.

In the recording mode, identification (ID) signals which respectively correspond to modes A1 to A5 are recorded together with the PCM sound signals. As shown in FIG. 5, in the case of recording the broadcasting signal, a mode signal $M_1$ is supplied to a block 60 which comprises an ID change-over signal generator and a channel change-over signal generator. The mode signal $M_1$ indicates one of the monaural (A4), stereo (A2) and bilingual (A1) modes. In the case of recording a microphone output or an external input, a mode signal $M_2$ is supplied to the block 60 so as to indicate that the input signal corresponds to one of the stereo (A3), monaural (A4) and 1-channel after-recording (A5) modes. The mode signal $M_2$ is generated by a control section of the VTR.

The block 60 generates an ID change-over signal $S_1$ corresponding to one of the modes A1 to A5 in accordance with the mode signal $M_1$ or $M_2$. Furthermore, the block 60 generates a channel change-over signal $S_2$. The signal $S_2$ is supplied to the block 61, whereas the signal $S_1$ is supplied to the block 62.

In the block 62, part or all of the contents of the marker shown in FIG. 6 is changed in accordance with the signal $S_1$. An updated marker is recorded as a identification signal. For example, a code "11110000" is recorded as a marker in the mode A1. A code "11110011" is recorded as a marker in the mode A2. The reproduction mode is determined in accordance with the reproduction signal of the marker.

Figure 7:
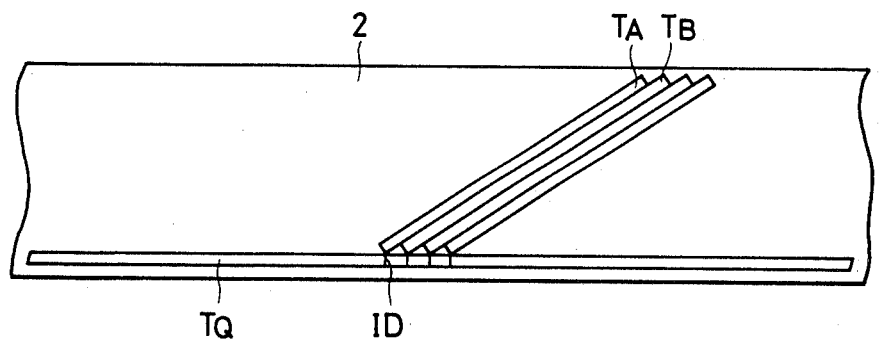
FIG. 7 is a plan view of a portion of the magnetic tape so as to explain its recording pattern when a cue track is arranged.

Another recording method is provided to record the ID data signal as follows. An ID bit is assigned in the data block of the PCM sound recording signal. In this case, an ID code is formed in accordance with the ID change-over signal $S_1$ to record the obtained ID code. Alternatively, as shown in FIG. 7, a cue track $T_Q$ is formed in the tape pattern, thereby recording the ID data signal by the stationary head.

It is preferred that the ID data signal is recorded for every track (or field) so as to allow random reproduction.

Referring again to FIG. 5, in the reproduction mode, the reproduced PCM sound signal from the rotary reproducing head 40 is supplied to a block 65 which comprises an FM demodulator, a decoder, and a marker detector, and to a block 64 which comprises a D/A converter and a channel change-over circuit. The sound signal is properly processed and is produced as an audio signal. In the block 65, a marker signal $S_3$ detected by the marker detector is supplied to a block 66 which comprises an identification circuit and a channel change-over signal generator. The mode of the recorded sound signal is discriminated so as to correspond to one of the modes A1 to A5. Furthermore, a channel change-over signal $S_4$ for selecting the channel L or R is produced. The channel selection signal $S_4$ is supplied to the block 64. For example, the channel selection operation is performed like the reproduced output shown in Table 1.

In the case with reference with Table 1, Japanese is produced from the right and left channels R and L in the mode A1. It is noted that the English output can be obtained by the operation of the manual channel selection switch. A matrix operation is performed to produce the R and L signals respectively from the right and left channels R and L in the mode A2. The reproduced sound signals of the first and second channels are respectively produced at the right and left channels R and L in the recording mode A3.

The monaural signals are produced at the right and left channels R and L in the recording mode A4. The original sound (a) of the first channel and the after-recorded sound (b) of the second channel are added to produce a (a)+(b) monaural sound signal which appears at the right and left channels R and L in the recording mode A5.

In the manual mode selection mode, as shown in FIG. 5, a mode signal is supplied to the block 60 of the recording system and to the block 66 of the reproducing system. Therefore, desired recording and reproducing modes are specified independently of each other. Furthermore, the recording mode can be automatically set and the reproducing mode can be manually set. Alternatively, the recording mode may be manually set, and the reproducing mode may be automatically set (i.e., the channel selection is automatically performed).

In the above embodiment, the modes A1 to A5 are used. However, the modes A2 and A4 or the modes A3 and A4 need not be distinguished from each other. Furthermore, only one of the modes A2 and A3 may be utilized.

According to the present invention, an ID code is recorded to detect the contents of the coded sound signal recorded in accordance with 2-channel recording. In the reproducing mode, the output conditions at the two channels are then determined.

According to the present invention, a sound monitor output can be automatically obtained so as to correspond to various types of after-recording modes and multiplex sound signal recording.

What is claimed is:

1. An apparatus operable in any of a monaural, stereo or bilingual mode for recording and reproducing an information signal formed of a video signal and two channels of audio signals in a plurality of successive tracks on a record medium, each track being divided into at least two sections, comprising:
   an audio signal source;
   means connected to said audio signal source for generating two channels of audio signals;
   means for converting said audio signals into digital audio signals;
   means including filter circuitry responsive to signals from said source for generating a digital identification signal identifying one of said modes;
   recording means connected for recording said video signal, said digital audio signals, and said digital identification signal in said plurality of successive tracks so that said video signal is recorded in at least one of said sections of each track and said audio signals are recorded in another section of each track;
   means for reproducing said video signal, said audio signals and said identification signal from said record medium;
   means for detecting said identification signal from the reproduced signals and producing a control signal therefrom; and
   switching means connected to said reproduced audio signals and responsive to said control signal for selecting said one of said modes.

2. An apparatus according to claim 1, comprising summing means for adding said digital identification signal to the digital audio signals to produce a resultant summed signal so that said digital identification signal is recorded by said recording means in the same section of each track as that where the digital audio signals are recorded.

3. An apparatus according to claim 2, further comprising a parity signal adder for adding a parity signal to the digital audio signals for error correction when the audio signals are reproduced.

4. An apparatus according to claim 1, further comprising second recording means including a fixed head to record said identification signal in an additional track.

5. An apparatus according to claim 1, in which said recording means records said identification signal at least once every track.

6. An apparatus according to claim 1, wherein said means for converting comprises an analog-to-digital converting circuit.

7. Apparatus operable in any of a monaural, stereo or bilingual mode for recording and reproducing an information signal formed of a video signal and audio signals in a plurality of successive tracks on a magnetic record medium, comprising:
   an audio signal source;
   means responsive to said source for generating two channels of audio signals;
   means for converting said audio signals into digital audio signals;

means including filter circuitry responsive to said source for generating a digital identification signal identifying one of said modes;

means for recording said video signal, said digital audio signals, and said identification signal in said successive tracks on said magnetic record medium;

means for reproducing said video signal, said digital audio signals, and said identification signal from said successive tracks on said magnetic record medium;

means responsive to said reproduced identification signal for producing a control signal therefrom; and output means responsive to the reproduced digital audio signals and to said control signal for selecting said one of said modes.

8. Apparatus for recording and reproducing according to claim 7, in which said means for converting includes an analog-to-digital converting circuit.

9. Apparatus for recording and reproducing according to claim 8, in which said means for recording includes summing means connected to add said digital audio signals and said identification signal to form a summed audio signal to be recorded.

10. Apparatus for recording and reproducing according to claim 9, in which said means for recording includes pulse code modulation encoder means for encoding said summed audio signal.

11. Apparatus for recording and reproducing according to claim 7, in which said audio signals comprise monaural signals and said identification signal identifies said monaural mode.

12. Apparatus for recording and reproducing according to claim 7, in which said filter circuitry includes a bandpass filter.

13. Apparatus for recording and reproducing according to claim 7, in which said means responsive to said source for generating a digital identification signal includes digital code generator means for generating a plurality of different multiple-bit digital words forming said identification signal.

14. Apparatus for recording and reproducing according to claim 7, in which said means for recording includes a pulse code modulation encoder for encoding signals to be recorded and said means for reproducing includes a pulse code modulation decoder for decoding reproduced signals.

15. Apparatus for recording and reproducing according to claim 7, in which said output means includes switching matrix means for providing left channel and right channel signals, respectively, when said audio signals are formed as stereo signals.

16. Apparatus for recording and reproducing according to claim 7, in which said output means includes manual switch means for selectively connecting the audio signals to output terminals of said output means.

* * * * *